Figure 1:
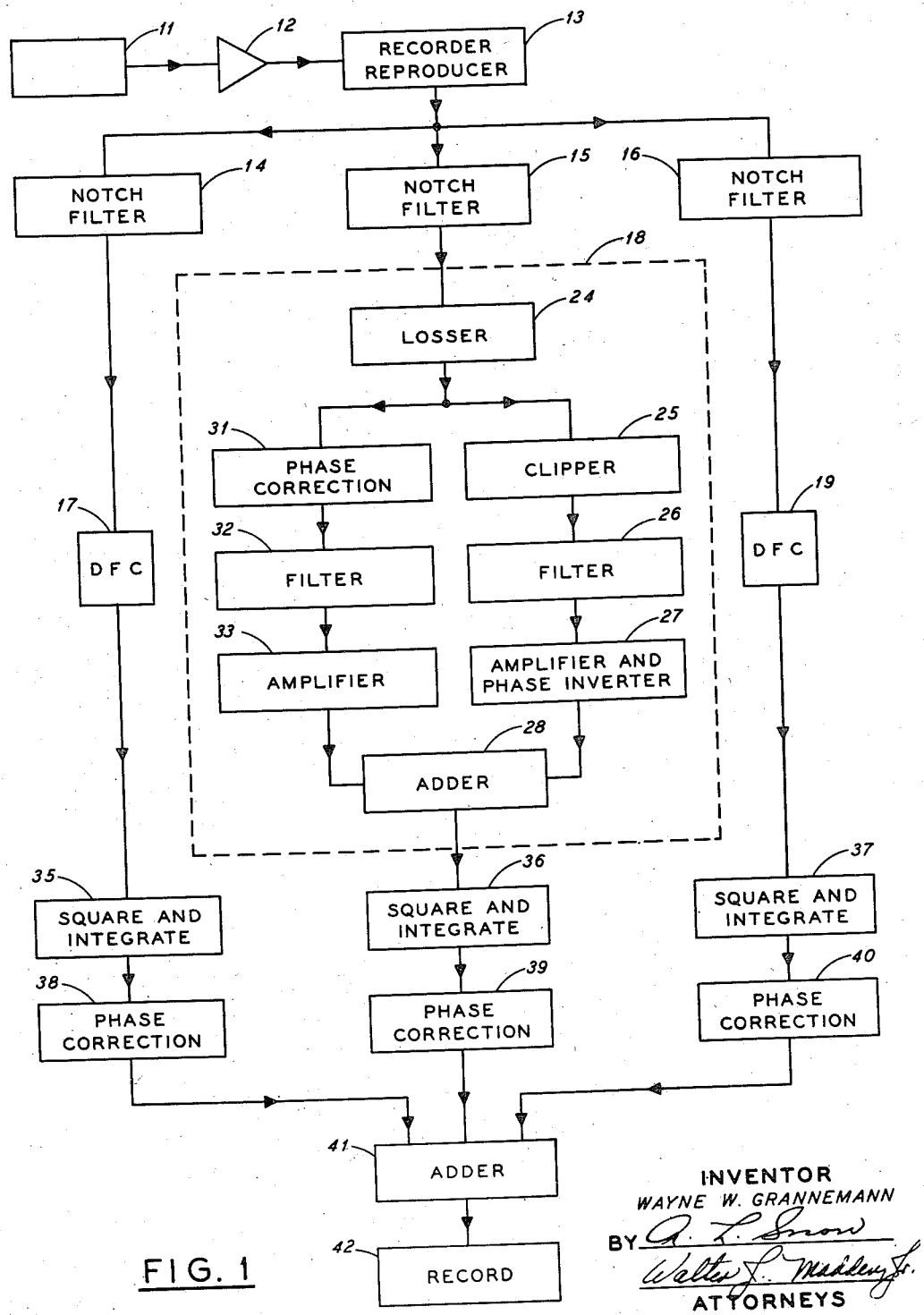

March 11, 1958 W. W. GRANNEMANN 2,826,750
METHOD OF REMOVING NOISE FROM SEISMIC SIGNALS
Filed Nov. 29, 1955 2 Sheets-Sheet 2

INVENTOR
WAYNE W. GRANNEMANN
BY
ATTORNEYS

# United States Patent Office 2,826,750
Patented Mar. 11, 1958

2,826,750

METHOD OF REMOVING NOISE FROM SEISMIC SIGNALS

Wayne W. Grannemann, Fullerton, Calif., assignor to California Research Corporation, San Francisco, Calif., a corporation of Delaware Application November 29, 1955, Serial No. 549,593

9 Claims. (Cl. 340—15)

This invention relates in general to seismic prospecting and is directed more particularly to the elimination of noise from seismic detector signals.

In the art of seismic prospecting, a seismic impulse is generated somewhere within the earth's crust and the resultant earth movement at a plurality of points more or less spaced from the point of origin of the impulse is recorded by means of seismic wave detectors. The original impulse sets up an elastic wave which is transmitted through the earth, and this wave, in general, will comprise a damped wave train. Any discontinuity or variation of structure within the earth will reflect and/or refract or diffract this wave train or a portion thereof so that the record made at the receiving point will comprise a number of arriving waves, each differing from the others in time of arrival or magnitude, or both.

The reflected or refracted wave energy whose measure is desired is generally very small and requires instruments of high sensitivity and high magnification for satisfactory detection. Furthermore, the earth's surface is often in motion, due to wind and wave action, traffic, pulsations from heavy machinery and to unwanted forms of wave motion generated by and radiating from the explosion. When this extraneous energy is of the order of magnitude of the desired signal, interference results which diminishes the reliability of the data, and when, as is often the case, the extraneous energy is greater in magnitude than the desired signal, it may be impossible to recognize the reflected or refracted waves with any degree of certainty. Thus, the usual seismic detector trace comprises a more or less continuous noise portion, with signal portions, representing reflections of interest, superposed thereon.

In general, a seismic reflection in a seismic detector trace can be approximated by a one and one-half (1½) cycle sine wave. Thus, if the seismic record can be analyzed by eliminating the portions thereof having a duration of more than and less than 1½ cycles, such action should eliminate all noise having a duration of either more than or less than 1½ cycles without substantially affecting the reflections. After such action, the remaining portion of the seismic detector trace should comprise the 1½ cycle approximations of seismic reflections and any noise having a duration of approximately 1½ cycles. Although the above discussion is based on a pulse duration of 1½ cycles, it will be understood that other pulse durations, such as 2 cycles, may be utilized where changes in subsurface conditions or changes in the seismic detectors or amplifiers make such a pulse length more suitable. That is, the 1½ cycle pulse length is an average value which may be adjusted for optimum results.

Broadly the present invention contemplates methods and apparatus for analyzing seismic detector traces in which the seismic reflection or signal portion thereof is approximated as substantially a 1½ cycle sine wave. The trace is first passed through a network which substantially equalizes the amplitudes except for signal and noise portions of 1½ cycles or less. The trace is then passed through a network, which substantially eliminates the signal portions and noise portions of longer than 1½ cycles' duration, so that only the 1½ cycle signal portions and the noise portions of a duration of 1½ cycles and less remain. These remaining portions are then passed through a network which eliminates portions of less than 1½ cycles' duration, so that only the 1½ cycle portions remain. These 1½ cycle portions may contain both signal and noise, although there may be no 1½ cycle noise present in the particular trace, in which case only 1½ cycle signal portions remain.

More particularly, in the present invention the seismic detector trace is first passed through one or more narrow pass band filters to confine the trace to a narrow frequency band or bands. The output from the narrow pass band filter is then supplied to a dominant frequency eliminating network which includes a losser feedback network for controlling the amplitude of the signal passing therethrough. The losser feedback network has a time constant such that the first 1½ cycles of a portion of the signal of increasing amplitude pass through the losser without effect, but portions subsequent to the first 1½ cycles are strongly attenuated. The output from the losser network is then supplied to a network which removes the noise portion of greater than 1½ cycles so that the seismic reflection of 1½ cycles and noise of 1½ cycles and less remain. This signal is then supplied to a suitable network, such as a squaring and integrating network, where portions having a duration of less than 1½ cycles are eliminated. The output from this last-named network then would ideally comprise the 1½ cycle signal portions with substantially all noise, except 1½ cycle portions, if present, removed therefrom.

In additional form of the present invention, the seismic detector trace may be differentiated prior to passage through the dominant frequency cancellation network to emphasize reflections or signal portions which appear in the original trace as phase variations. As a further refinement of the present invention, the phase and amplitude of the signal in the dominant frequency cancellation network may be automatically regulated to provide a more exact cancellation of the undesired noise portion.

Figure 2:
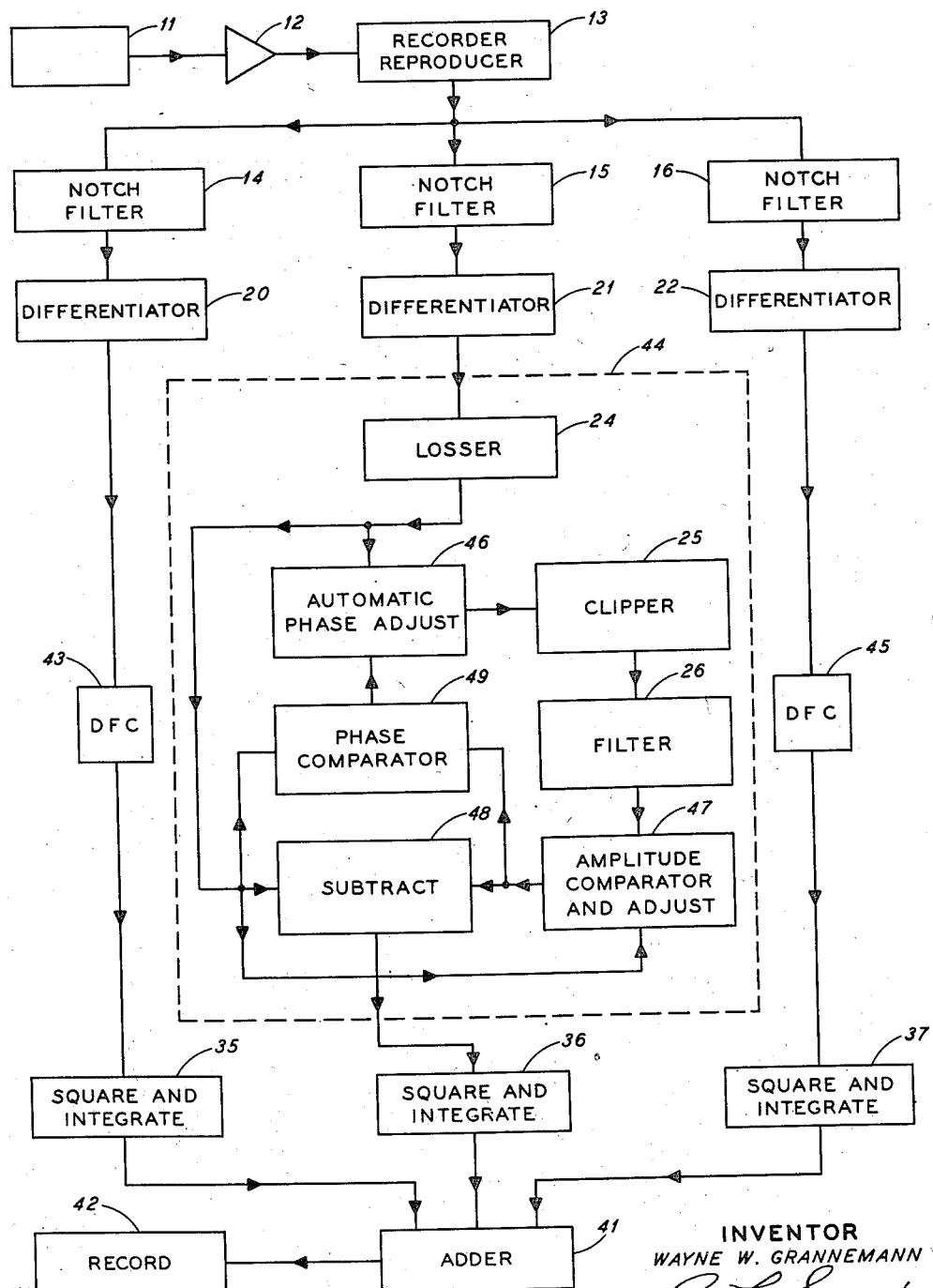

The nature and objects of the present invention will be further apparent from the following description when read in connection with the accompanying drawings, in which:

Fig. 1 diagrammatically illustrates one embodiment of the present invention, and Fig. 2 diagrammatically illustrates an alternate embodiment of the invention in which automatic phase and amplitude regulation is utilized in the dominant frequency cancellation network.

Referring to Fig. 1 by character of reference, numeral 11 designates a seismic wave detector for producing a seismic trace having an amplitude corresponding to movement of the earth in response to a seismic disturbance. The output signal from detector 11 is supplied through an amplifier 12 to a suitable reproducible recording device generally designated as 13. Recording device 13 may be of any suitable known type, such as a photographic or magnetic medium, on which the seismic detector traces may be recorded and reproduced repeatedly and at will. Although only one seismic detector and its associated amplifying channel have been illustrated, it will be obvious to those skilled in the art that in practice a large number of such detectors are normally utilized for each seismic disturbance and that such detectors may be arranged in any suitable configuration.

After the seismic detector trace is recorded on device 13 through amplifier 12, the trace is reproduced from device 13 and supplied to a plurality of narrow band pass filters connected in parallel. In the embodiment illustrated in Fig. 1, three such filters, 14, 15 and 16, are shown, although it will be understood that the number of such filters may be varied in dependence upon the number of different frequency bands of interest in the seismic detector signal. The outputs from filters 14, 15 and 16 are supplied to separate dominant frequency component elimination or cancellation networks. The elimination network associated with filter 15 comprises the elements enclosed within the dotted enclosure and is identified by reference character 18. Each of such networks for the different filters is preferably identical and accordingly only the network 18 corresponding to filter 15 is shown in detail. The cancellation networks associated with filters 14 and 16 are shown schematically as 17 and 19 respectively, it being understood that these networks are substantially identical to network 18.

Dominant frequency cancellation network 18 includes a losser network 24 to which the signal from filter 15 is supplied and which acts as a type of automatic gain control to maintain the amplitude of the signal passing therethrough within predetermined limits. The output from filter 15 comprises a wave train of variable amplitude having a frequency lying within the pass band of filter 15. That is, the wave train from filter 15 may be considered to comprise a noise portion of constant or slowly varying amplitude, with interspersed portions of abruptly increasing amplitude, representing signal portions, superposed on the noise portion. Losser network 24 has a time constant such that the portions of constant or slowly varying amplitude are equalized in amplitude, but when the amplitude of the signal supplied to losser 24 increases abruptly, approximately the first 1½ cycles of this portion of increasing amplitude pass through losser network 24 substantially unchanged in amplitude before losser 24 acts to reduce the amplitude. Thus, the output from losser network 24 comprises a wave train of substantially constant amplitude, with intermittent 1½ cycle portions of increased amplitude interspersed therein. The first 1½ cycles of the signal portion of the trace, plus 1½ cycles of the noise portion which is in time coincidence with this signal portion, are thus passed by losser network 24.

The output from losser network 24 is then supplied in common to a pair of parallel branch networks. One branch of this network comprises a clipper 25 having an output connected to a smoothing filter 26 whose output in turn is connected to an amplifier and phase inverter network 27. The output of amplifier and phase inverter network 27 is supplied to an adder network 28. Clipper 25 acts to produce a constant amplitude square wave whose axis crossing points or frequency correspond to the axis crossing points or frequency of the signal from losser 24. This square wave of constant amplitude from clipper 25 is supplied to filter 26 which removes the harmonics of the square wave and produces a sine wave having a constant amplitude and a frequency determined by the frequency of the signal from losser 24. This sinusoidal wave train is supplied to network 27 where it is amplified, inverted in phase, and supplied to adder network 28.

The other branch of the parallel network comprises a phase correction circuit 31 which serves to vary the phase of the signal passing therethrough in accordance with the phase changes which are introduced in the other branch signal in passing through clipper network 25. Phase correction network 31 may thus be a simple filter network having the same phase transmission characteristics as clipper 25. The output from phase correction network 31 is supplied to a filter 32 which is substantially identical to filter 26. The output from filter 32 is supplied through an amplifier 33 to another input of adder network 28. Network 28 serves to add the two signals supplied thereto, and since the signal supplied from network 27 has been inverted in phase, the signal from network 27 is effectively subtracted from the signal from amplifier 33.

The action of the dominant frequency cancellation network may perhaps be best understood by considering its operation on a simple wave train having relatively slowly changing amplitude variations extending more or less along the entire trace and also having abrupt amplitude variations of a few cycles' duration, corresponding to a signal portion, superposed at various times on the noise portion. In passing through losser 24, the relatively slowly changing amplitude variations are equalized in amplitude by the gain control action of network 24. However, the time constant of losser network 24 is such that the first 1½ cycles of the relatively abruptly increasing signal portion will pass through losser network 24 substantially unaltered in amplitude before losser network 24 responds to again equalize the wave train amplitude. The output from losser 24 would thus be a wave train comprising a noise portion having an envelope of substantially constant amplitude with signal portions of increased amplitude and of substantially 1½ cycles duration interspersed therein.

In clipper 25 this hypothetical wave train would be converted into a square wave having a constant amplitude and a frequency determined by the frequency of the input wave train. Thus, clipper 25 would effectively eliminate the 1½ cycle signal and noise portion from the wave train supplied thereto. Filter 26 converts this constant-amplitude square wave into a substantially sinusoidal wave train of the same frequency and of constant amplitude. When the two signals are combined in adder network 28, the constant amplitude signal from network 27 cancels its corresponding portion in the wave train from amplifier 33. The difference between the two wave trains supplied to adder 28 is the presence in the wave train from amplifier 33 of the portions of 1½ cycles and less. Thus, the noise portion of greater than 1½ cycles duration is effectively cancelled so that the output of adder 28 comprises the 1½ cycle signal and noise portion plus a noise portion having a duration of less than 1½ cycles.

The output from the dominant frequency elimination network is then supplied to a device for eliminating the noise portion having a duration of less than 1½ cycles. Such a device may be a squaring and integrating network 36 which acts to average the signal supplied thereto and effectively eliminates the portions of short duration. Similar squaring and integrating networks 35 and 37 may be provided for dominant frequency elimination networks 17 and 19, respectively. The outputs from networks 35, 36 and 37, then, ideally comprise only the 1½ cycle signal and noise portions which have frequencies lying within the pass bands of the respective filters 14, 15 and 16. The outputs from the squaring and integrating networks 35, 36 and 37 may then, if desired, be passed through a plurality of phase correction networks 38, 39 and 40 for eliminating any undesired phase distortion introduced in the operation. The outputs from the phase correction networks are supplied jointly to an adder or summing network 41 where the different signals are combined to produce a resultant signal representing the sum of the 1½ cycle signal and noise portions from the different parallel networks. This resultant output signal is supplied to a suitable recorder 42 for analysis.

The embodiment of Fig. 1 is particularly well adapted for use where the reflections of interest are superposed on the noise portion as amplitude changes and may readily be detected after subtraction of the noise portion. As mentioned earlier, however, the reflections of interest may sometimes appear on the detector trace only as phase changes therein without any substantial effect on the amplitude of the trace. Such phase changes are difficult to detect, particularly where the total trace is substantially a sinusoidal wave train.

The embodiment illustrated in Fig. 2 may be utilized to convert these phase changes into amplitude changes prior to subtraction of the noise energy from the trace. Additionally, the embodiment of Fig. 2 provides for automatic regulation of the amplitude and the phase of the signals produced in the dominant frequency cancellation networks to produce more exact cancellation of the noise. In Fig. 2, seismic detector 11 produces an output signal which is supplied through amplifier 12 to recorder/reproducer 13, and the output from recorder/reproducer 13 is supplied in parallel to notch filters 14, 15 and 16, as before. The outputs from filters 14, 15 and 16 are supplied to a plurality of suitable differentiating networks 20, 21 and 22 which serve to produce output signals proportional to the first derivative of the traces supplied thereto. Variations in the frequency of the input signals to differentiating networks 20, 21 and 22 are thus reflected as variations in the amplitudes of the differentiated output signals thereof. This increases the possibility of detecting the presence of reflections of interest in the resultant traces since, in general, a variation in amplitude is easier to detect than a variation in frequency, particularly in a wave train which is nearly sinusoidal over a relatively long duration.

The output from differentiator 21 is supplied to a dominant-frequency elimination network which comprises the elements in the dotted enclosure 44. Similar dominant-frequency elimination networks 43 and 45 are provided for differentiating networks 20 and 22, respectively. Network 44 includes a losser 24 which functions in a manner identical to that described in connection with losser 24 in Fig. 1. The output from losser 24 is supplied to a pair of parallel branch networks. One branch includes an automatic phase adjusting network 46 whose output signal is supplied to clipper 25. The output from clipper 25 is supplied through filter 26 to an automatic amplitude comparing and adjusting network 47. The output from comparator 47 is supplied as one input to a subtracting network 48. The other input to subtracting network 48 is supplied from losser 24.

A phase comparator network 49 receives one input signal corresponding to the output signal of amplitude comparator 47 and receives another input signal corresponding to the output signal from losser 24. Phase comparator 49 acts to compare the phases of these two input signals and supply a control signal to automatic phase adjusting network 46 to adjust the phase of the signal passing therethrough to match the phase of the signal supplied from losser 24. The time constant of networks 46 and 49 is such that they act on the average phase averaged over a suitable time interval. That is, they have a time constant such that they do not appreciably affect the portions of 1½ cycles and act only on the portions exceeding 1½ cycles.

Amplitude comparator network 47 compares the amplitude of the signal from filter 26 with that of the signal from losser 24 and adjusts the amplitude of the signal from filter 26 to substantially equalize the amplitudes of the input signals to subtracting network 48. Amplitude comparing and adjusting network 47 has a time constant such that it does not appreciably affect the 1½ cycle portions and acts only on those portions exceeding 1½ cycles. The phase and amplitude of the signals in cancellation network 44 are thus automatically regulated during the operation so that the cancellation action of the network will be most effective. The dominant-frequency cancellation networks of Fig. 2 thus operate in a manner similar to that described above in connection with Fig. 1 to eliminate the noise portions of greater than 1½ cycles from the 1½ cycle signal and noise portions.

The output from subtracting network 48 is supplied to squaring and integrating network 36. The outputs from dominant-frequency cancellation networks 43 and 45 are similarly supplied to squaring and integrating networks 35 and 37 respectively. Squaring and integrating networks 35, 36 and 37 operate in a manner similar to that described above in connection with Fig. 1 to smooth or eliminate the portions of less than 1½ cycles duration. The outputs from networks 35, 36 and 37 are supplied to a summation network 41. These signals are combined in network 41 to produce a resultant signal which is supplied to recorder 42.

The embodiment illustrated in Fig. 2 has the advantage with respect to the embodiment of Fig. 1 that one output from losser 24 is supplied directly to one input of subtracting network 48 so that no phase distortion is introduced into this signal. The embodiment of Fig. 2 has the additional advantage that the use of automatic phase and amplitude regulation to a large extent eliminates the need for manual adjustment of these quantities, thus increasing the accuracy and the speed of operation of the system. The embodiment illustrated in Fig. 1, on the other hand, has the advantage that the output circuit from losser 24 is substantially perfectly balanced through both of the branch networks, thus reducing the possibility of asymmetrical phase distortion in the two branches.

Although but a few illustrative embodiments of the present invention have been described, it will be apparent to those skilled in the art that various changes and modifications may be made therein without departing from the spirit of the invention or the scope of the appended claims.

I claim:

1. Apparatus for analyzing a seismic detector trace to emphasize signal portions therein which are superposed on a substantially continuous noise portion, said signal portions having increased amplitude with respect to said noise portion, comprising a filter network having a narrow pass band for confining said trace to a band of frequencies within said pass band, a variable losser network connected to the output of said filter network, said losser network having a time constant such that approximately the first one and one-half cycles of portions of said trace of increasing amplitude pass through said losser network without any substantial change in amplitude and the other portions of said trace are substantially equalized in amplitude, means connected to said losser network for producing a substantially sinusoidal signal having a substantially constant amplitude and having a frequency determined by the frequency of said noise portion, and means for subtracting said sinusoidal signal from the output signal of said losser network to produce a resultant signal comprising a series of one and one-half cycle components corresponding to said signal portions.

2. Apparatus for analyzing a seismic detector trace to emphasize signal portions therein which are superposed on a substantially continuous noise portion, said signal portions having increased amplitude with respect to said noise portion, comprising a filter network having a narrow pass band for confining said trace to a band of frequencies within said pass band, a variable losser network connected to the output of said filter network, said losser network having a time constant such that approximately the first one and one-half cycles of portions of said trace of increasing amplitude pass through said losser network without any substantial change in amplitude and the other portions of said trace are substantially equalized in amplitude, a clipping network connected to the output of said losser network for producing a square wave signal having axis crossing points corresponding to the axis crossing points of the output signal from said losser network, a smoothing filter for converting said square wave signal into a substantially sinusoidal signal having a substantially constant amplitude and having a frequency determined by the frequency of said noise portion, and means for subtracting said sinusoidal signal from the output signal of said losser network to produce a resultant signal comprising a series of one and one-half cycle components corresponding to said signal portions.

3. Apparatus for analyzing a seismic detector trace to emphasize signal portions therein which are superposed on a substantially continuous noise portion, said signal portions having increased amplitude with respect to said noise portion, comprising a filter network having a narrow pass band for confining said trace to a band of frequencies within said pass band, a variable losser network connected to the output of said filter network, said losser network having a time constant such that approximately the first one and one-half cycles of portions of said trace of increasing amplitude pass through said losser network without any substantial change in amplitude and the other portions of said trace are substantially equalized in amplitude, a clipping network connected to the output of said losser network for producing a square wave signal having axis crossing points corresponding to the axis crossing points of the output signal from said losser network, a smoothing filter for converting said square wave signal into a substantially sinusoidal signal having a substantially constant amplitude and having a frequency determined by the frequency of said noise portion, means for subtracting said sinusoidal signal from the output signal of said losser network to produce a resultant signal comprising a series of one and one-half cycle components corresponding to said signal portions, and means for averaging said resultant signal to remove therefrom portions having a duration of less than one and one-half cycles.

4. Apparatus for analyzing a seismic detector trace to emphasize signal portions therein which are superposed on a substantially continuous noise portion, said signal portions having increased amplitude with respect to said noise portion, comprising a variable losser network, said losser network having a time constant such that approximately the first one and one-half cycles of portions of said trace of increasing amplitude pass through said losser network without any substantial change in amplitude and the other portions of said trace are substantially equalized in amplitude, a clipping network connected to the output of said losser network for producing a square wave signal having axis crossing points corresponding to the axis crossing points of the output signal from said losser network, a smoothing filter for converting said square wave signal into a substantially sinusoidal signal having a substantially constant amplitude and having a frequency determined by the frequency of said noise portion, and means for subtracting said sinusoidal signal from the output signal of said losser network to produce a resultant signal comprising a series of one and one-half cycle components corresponding to said signal portions.

5. Apparatus for analyzing a seismic detector trace to emphasize signal portions therein which are superposed on a substantially continuous noise portion, said signal portions having increased amplitude with respect to said noise portion, comprising a filter network having a narrow pass band for confining said trace to a band of frequencies within said pass band, differentiating means for differentiating said filtered trace, a variable losser network connected to the output of said differentiating means, said losser network having a time constant such that approximately the first one and one-half cycles of portions of said differentiated trace of increasing amplitude pass through said losser network without any substantial change in amplitude and the other portions of said differentiated trace are substantially equalized in amplitude, a clipping network connected to the output of said losser network for producing a square wave signal having axis crossing points corresponding to the axis crossing points of the output signal from said losser network, a smoothing filter for converting said square wave signal into a substantially sinusoidal signal having a substantially constant amplitude and having a frequency determined by the frequency of said noise portion, and means for subtracting said sinusoidal signal from the output signal of said losser network to produce a resultant signal comprising a series of one and one-half cycle components corresponding to said signal portions.

6. Apparatus for analyzing a seismic detector trace to emphasize signal portions therein which are superposed on a substantially continuous noise portion, said signal portions having increased amplitude with respect to said noise portion, comprising a filter network having a narrow pass band for confining said trace to a band of frequencies within said pass band, differentiating means connected to said filtering network for differentiating said filtered trace, a variable losser network connected to the output of said differentiating means, said losser network having a time constant such that approximately the first one and one-half cycles of portions of said differentiated trace of increasing amplitude passes through said losser network without any substantial change in amplitude and the other portions of said differentiated trace are substantially equalized in amplitude, a clipping network connected to the output of said losser network for producing a square wave signal having axis crossing points corresponding to the axis crossing points of the output signal from said losser network, a smoothing filter for converting said square wave signal into a substantially sinusoidal signal having a substantially constant amplitude and having a frequency determined by the frequency of said noise portion, means for subtracting said sinusoidal signal from the output signal of said losser network to produce a resultant signal comprising a series of one and one-half cycle components corresponding to said signal portions, and means for averaging said resultant signal to remove therefrom portions having a duration of less than one and one-half cycles.

7. Apparatus for analyzing a seismic detector trace to emphasize signal portions therein which are superposed on a substantially continuous noise portion, said signal portions having increased amplitude with respect to said noise portion, comprising a plurality of filter networks having narrow pass bands for confining said trace to a frequency range determined by said pass bands, a variable losser network connected to the output of each of said filter networks, each of said losser networks having a time constant such that approximately the first one and one-half cycles of portions of said filtered trace of increasing amplitude pass through said losser network without any substantial change in amplitude and the other portions of said filtered trace are substantially equalized in amplitude, a clipping network connected to the output of each of said losser networks for producing a square wave signal having axis crossing points corresponding to the axis crossing points of the output signal from said losser network, a plurality of smoothing filters for converting each of said square wave signals into a substantially sinusoidal signal having a substantially constant amplitude and having a frequency determined by the frequency of said noise portion, and means for subtracting each of said sinusoidal signals from the output signal of the corresponding one of said losser networks to produce a plurality of resultant signals comprising a series of one and one-half cycle components corresponding to said signal portions.

8. Apparatus for analyzing a seismic detector trace to emphasize signal portions therein which are superposed on a substantially continuous noise portion, said signal portions having increased amplitude with respect to said noise portion, comprising a plurality of filter networks having narrow pass bands for confining said trace to a frequency range determined by said pass bands, a variable losser network connected to the output of each of said filter networks, each of said losser networks having a time constant such that approximately the first one and one-half cycles of portions of said filtered trace of increasing amplitude pass through said losser network without any substantial change in amplitude and the other portions of said filtered trace are substantially equalized in amplitude, a clipping network connected to the output of each of said losser networks for producing a square wave signal having axis crossing points corresponding to the axis crossing points of the output signal from said losser network, a plurality of smoothing filters for converting each of said square wave signals into a substantially sinusoidal signal having a substantially constant amplitude and having a frequency determined by the frequency of said noise portion, means for subtracting each of said sinusoidal signals from the output signal of the corresponding one of said losser networks to produce a plurality of resultant signals comprising a series of one and one-half cycle components corresponding to said signal portions, and means for averaging each of said resultant signals to remove therefrom portions having a duration of less than one and one-half cycles.

9. Apparatus for analyzing a seismic detector trace to emphasize signal portions therein which are superposed on a substantially continuous noise portion, said signal portions having increased amplitude with respect to said noise portion, comprising a plurality of filter networks having narrow pass bands for confining said trace to a frequency range determined by said pass bands, differentiating means connected to each of said filtering networks for differentiating each of said filtered traces, a variable losser network connected to the output of each of said differentiating means, each of said losser networks having a time constant such that approximately the first one and one-half cycles of portions of said differentiated trace of increasing amplitude pass through said losser network without any substantial change in amplitude and the other portions of said differentiated trace are substantially equalized in amplitude, a clipping network connected to the output of each of said losser networks for producing a square wave signal having axis crossing points corresponding to the axis crossing points of the output signal from each of said losser networks, a plurality of smoothing filters for converting each of said square wave signals into a substantially sinusoidal signal having a substantially constant amplitude and having a frequency determined by the frequency of said noise portion, means for subtracting each of said sinusoidal signals from the output signal of the corresponding one of said losser networks to produce a plurality of resultant signals comprising a series of one and one-half cycle components corresponding to said signal portions, and means for averaging each of said resultant signals to remove therefrom portions having a duration of less than one and one-half cycles.

References Cited in the file of this patent

UNITED STATES PATENTS

| | | |
|---|---|---|
| 2,578,133 | Hawkins | Dec. 11, 1951 |
| 2,620,890 | Lee | Dec. 9, 1952 |